(No Model.)　　　　　　　H. LEVER.
　　　　　　　　　COMBING MACHINE.

No. 414,555.　　　　　　　Patented Nov. 5, 1889.

Fig. 1.

Witnesses:
Fred. S. Greenleaf
Frederick L. Emery

Inventor.
Henry Lever,
By Crosby & Gregory Attys.

(No Model.) 9 Sheets—Sheet 2.

H. LEVER.
COMBING MACHINE.

No. 414,555. Patented Nov. 5, 1889.

Witnesses:
Fred. S. Greenleaf
Maurice L. Emery

Inventor:
Henry Lever,
by Crosby & Gregory
Attys.

(No Model.) 9 Sheets—Sheet 3.

H. LEVER.
COMBING MACHINE.

No. 414,555. Patented Nov. 5, 1889.

Witnesses:
Fred. S. Greenleaf
Maurice L. Emery

Inventor.
Henry Lever,
by Emily & Gregory
Attys.

(No Model.)

H. LEVER.
COMBING MACHINE.

No. 414,555.  Patented Nov. 5, 1889.

Witnesses.
Fred. S. Greenleaf
Frederick L. Emery

Inventor.
Henry Lever,
by Crosby Gregory
Attys.

N. PETERS, Photo-Lithographer, Washington, D. C.

(No Model.) 9 Sheets—Sheet 7.

H. LEVER.
COMBING MACHINE.

No. 414,555. Patented Nov. 5, 1889.

Witnesses:
Fred. S. Greenleaf
Frederick Emery.

Inventor:
Henry Lever,
by Crosby & Gregory Attys.

(No Model.) 9 Sheets—Sheet 8.

H. LEVER.
COMBING MACHINE.

No. 414,555. Patented Nov. 5, 1889.

Witnesses:
Fred. S. Greenleaf
Frederick L. Emery

Inventor:
Henry Lever,
by Crosby & Gregory
Attys.

(No Model.)

H. LEVER.
COMBING MACHINE.

No. 414,555.　　　　　Patented Nov. 5, 1889.

Witnesses.
Fred S. Greenleaf
Frederick L. Emery.

Inventor.
Henry Lever,
by Crosby & Gregory
Attys.

UNITED STATES PATENT OFFICE.

HENRY LEVER, OF METHUEN, MASSACHUSETTS, ASSIGNOR OF ONE-HALF TO ROBERT REDFORD, OF SAME PLACE.

COMBING-MACHINE.

SPECIFICATION forming part of Letters Patent No. 414,555, dated November 5, 1889.

Application filed March 26, 1889. Serial No. 304,848. (No model.)

*To all whom it may concern:*

Be it known that I, HENRY LEVER, a subject of the Queen of Great Britain, residing at Methuen, county of Essex, State of Massachusetts, have invented an Improvement in Combing-Machines, of which the following description, in connection with the accompanying drawings, is a specification, like letters on the drawings representing like parts.

This invention has for its object to improve that class of combing-machines employed to comb cotton and other fiber, the fiber being taken intermittingly from the end of a lap by jaws carried by a rotating cylinder, the fibers projecting from the end of the lap being combed before it is grasped between the jaws. The jaws having grasped the combed end of the laps, draws from the end of the lap a strip of fiber called a "tuft," the end of the tuft outside the jaws being in turn combed as the tuft is being detached from the lap by the jaws. Each set of jaws in its rotation with the cylinder presents upon a table the combed end of the tuft projecting from the jaw, and thereafter the tuft is acted upon by a holder which aids in removing the tuft from the jaws, that end of the tuft held between the jaws being preferably acted upon by the teeth of an auxiliary comb, which combs and straightens the fiber as the opened jaws give up the tuft, the latter being then held by the holder, as will be described.

In the machine herein to be described the combed tufts of fiber, taken from the laps by the jaws and deposited upon the table one after another, are made slightly to overlap each a preceding tuft, the tufts so laid forming a combed bat, which, acted upon by suitable drawing-rolls, is delivered as a thin film into a conductor or chute, from which, by condensing-rolls, it is taken through a trumpet, which forms the film into a sliver.

The action upon the fiber of the machine herein to be described is substantially the same as in other machines heretofore in use, United States Patent No. 246,770 showing one machine of this class.

Prior to my invention, and especially as shown in the patent referred to, the cylinder has combs attached to it at the rear of the fixed jaws, and the fixed jaws have co-operating with them movable jaws, but the said jaws have not had combs attached to or forming part thereof; and so also prior to my invention combing-machines in use have been provided with lags or bars which were made to slide in the arc of a circle on the cylinder during the rotation of the comb-cylinder, the rear edges of the said lags or bars, said edges being parallel to the axis of the cylinder, being made to perform the duty of jaws to grasp between them and the fixed jaws the combed ends of the lap to be drawn out by the jaws in the formation of tufts. So also in this class of machine prior to my invention a draft of air has been depended upon to insure the entrance of the combed end of the lap into the open space between the jaws.

To increase the speed of combing-machines and to do away with sliding comb-carrying lags, I have provided the comb-cylinder with rocking or oscillating jaws or clamps, and have so mounted and operated them that they are held open as the fixed jaw of the cylinder approaches the combed end of the lap; but as soon as the fixed jaw in its rising movement comes under the downturned combed ends of the fiber at the end of the lap and extending beyond the nippers and the said combed ends are made to fully cross and lie upon the fixed jaw, it continuing its rotation, the rocking or oscillating jaw is operated quickly toward the fixed jaw to clamp the combed end of the two laps, and thereafter the jaw pulls off a tuft and carries it around with the cylinder, delivering the tuft at the proper time upon the table to the action of the holder, as described.

In the machine described in the patent referred to the under jaw of the nippers for holding the lap is made in one piece, and with such a jaw it has been found impracticable to employ a lap of greater width than seven and one-half inches.

In my experiments to increase the product of this class of combing-machines I have found that by dividing the lower jaw of the nippers so that each half will act on and adapt itself independently to the lap that the width of the lap may be increased, thus greatly increasing the product of the machine. Instead, however, of making one broad lap, I find it of advantage to employ two laps placed side by side, the laps which I have used to greatest advantage being about five and one-half inches in width, each lap being acted upon by one part of the nippers. Should it be attempted to make a one-piece jaw act upon a lap of eleven inches in width, it would be impossible practically to hold the fibers of the lap in proper condition to be properly taken by the jaws from the nippers; but by dividing the jaw, as described, it is enabled to adapt itself to any variations in thickness of the mass of cotton coming into the machine to be combed.

Fig. 2 is a partial left-hand elevation, the driving-pulley and the cam for actuating the holder or delivery-bar being broken out to show gearing behind them. Fig. $2^a$ is a detail showing the two eccentric gears. Fig. 3 is a section of the machine shown in Fig. 1 on the dotted line $x$ and an elevation at the right. Fig. $3^a$ is a detail showing the pin-wheel $b^7$, but partially shown in Fig. 3. Fig. 15, a section in the line $x^4$, Fig. 13; Fig. $15^a$, a detail of the shaft 27.

Figures 3, 3A:
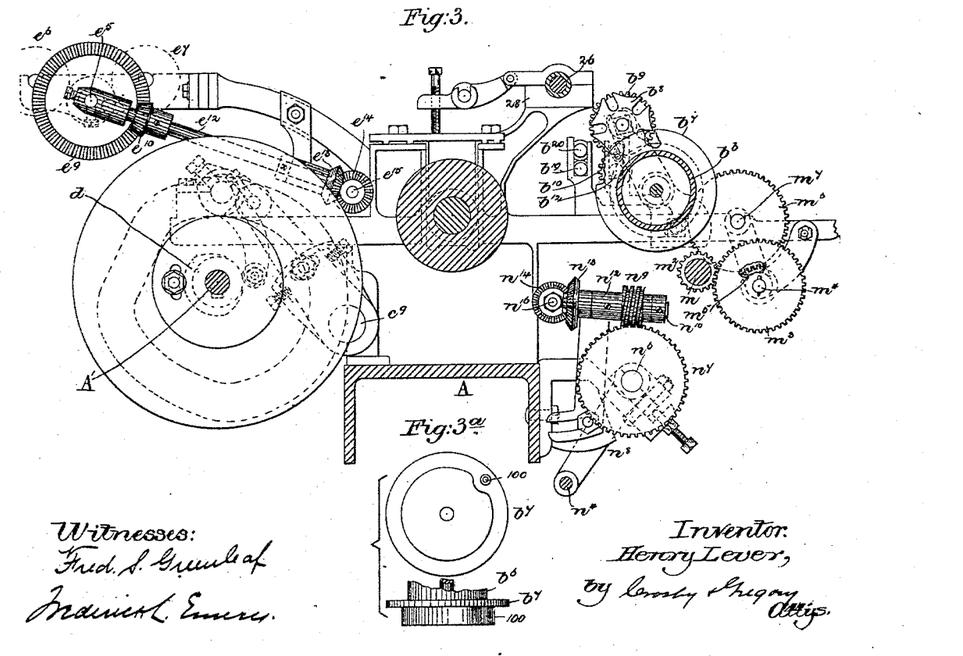
Figures 16, 17:
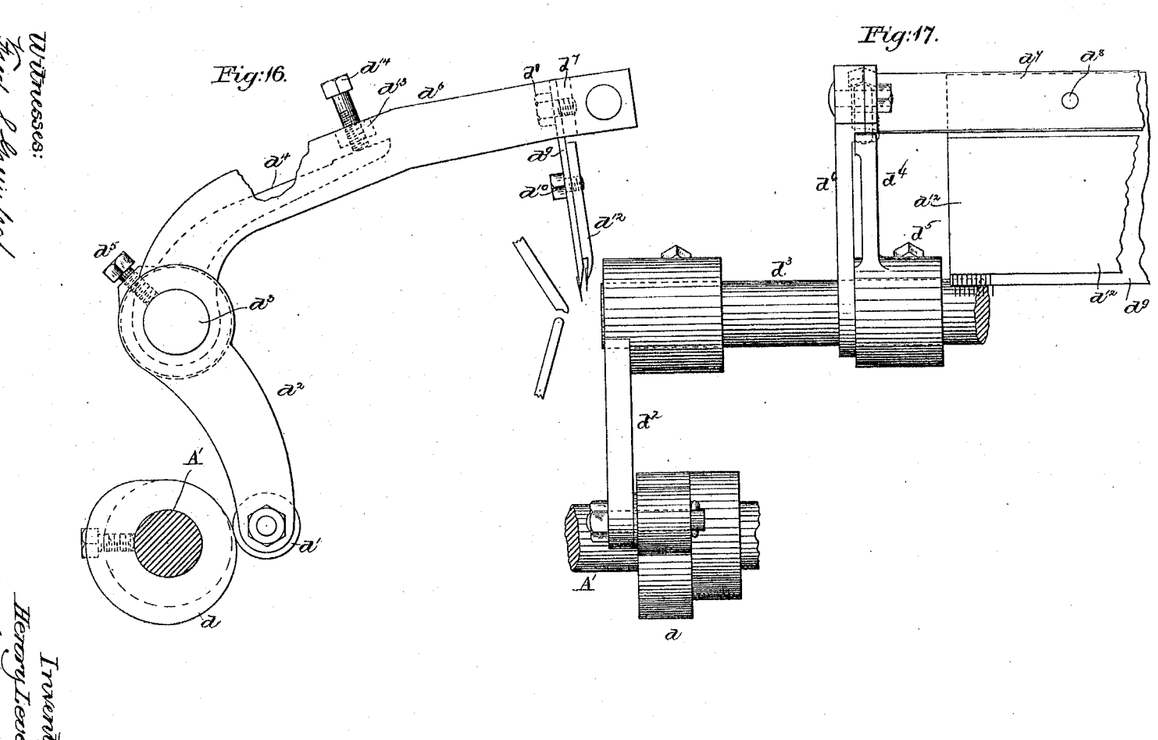
Figs. 16 and 17 are details showing the top comb for combing the fiber as it is being taken from the nippers by the jaws of the cylinder and means for moving the said comb, Fig. 16 also showing part of the nippers.

The frame-work A of the machine, of suitable shape to sustain the working parts, has bearings for the main shaft $A'$, having upon it any usual fast and loose pulleys $A^2$ for the reception of a belt by which to drive the same. This shaft has fast upon it an eccentric gear $a$, a pinion $b$, a nipper-actuating cam $c$, a cam $d$, shown by full lines in Figs. 16 and 17 and by dotted lines, Fig. 3, and a pin-wheel $e$ and a bevel-gear $w$.

Figure 5:
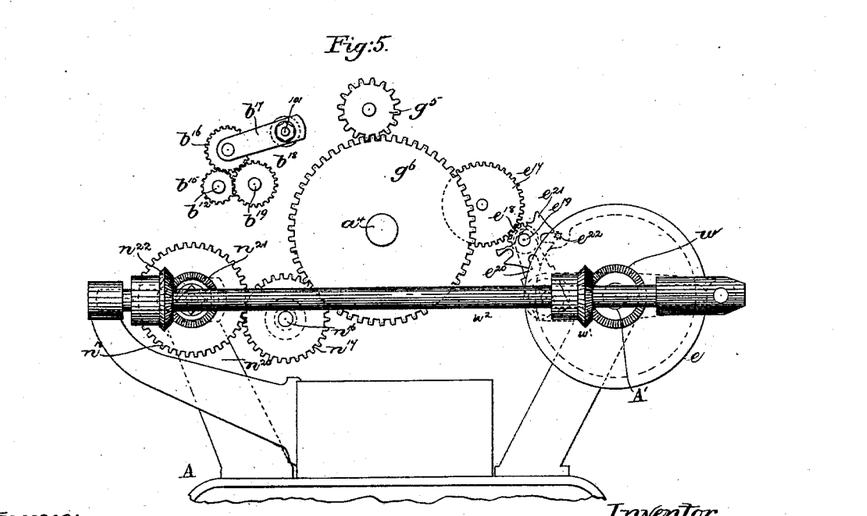
Fig. 5 is a partial right-hand end elevation of the parts which stand at that end of the machine outside the frame-work, the stand for the shaft or journals of the feed-rolls being omitted.

The two laps to be employed in the machine herein described will be wound to form rolls which will be placed end to end, parallel to the shaft $A'$ upon the two lap-rolls $e'$ $e^2$, between suitable lap-guides $e^3$ $e^4$ on a rod $e^5$, the guide $e^4$ serving to separate the contiguous edges of the two laps, each being in practice about five and one-half inches in width. The shaft of the roll $e'$ has a toothed gear $e^6$, and the shaft of the roll $e^2$ a toothed gear $e^7$ of same size, both the said gears being engaged with and driven by a toothed gear $e^8$, loose on the rod $e^5$, the said toothed gear having connected to it a beveled gear $e^9$, which is engaged by a beveled pinion $e^{10}$ fast on an inclined shaft $e^{12}$, provided at its lower end with a beveled gear $e^{13}$, which is engaged by a beveled gear $e^{14}$, fast upon one end of the lowermost roll $e^{15}$ of the pair of feed-rolls $e^{15}$ $e^{16}$, the feed-roll $e^{16}$ being partially broken out in Fig. 1 to show the feed-roll $e^{15}$ below it. The journals of the roll $e^{15}$ run in fixed bearings. The journals of the uppermost roll $e^{16}$ enter loosely the forked ends of levers $e^x$, mounted upon studs 12, secured in suitable stands attached to the frame-work, the rear ends of the said levers being acted upon by springs $e^{27}$, connected at their upper ends to a suitable lug $e^{28}$, forming part of the frame-work, the normal tendency of the said springs being to keep the uppermost feed-roll $e^{15}$ pressed upon the fibers lying upon the positively-rotated feed-roll $e^{15}$. The shaft of the lowermost feed-roll at the right-hand end of the machine (see Fig. 5) has fast upon it a toothed gear $e^{17}$, which is engaged by a pinion $e^{18}$, loose on a stud $e^{19}$ in a stand $e^{20}$, suitably bolted to the frame-work, the said pinion having connected to it the hub of a star-wheel $e^{21}$, the said star-wheel, of usual construction, being engaged intermittingly by the pin $e^{22}$ of the pin-wheel $e$, before referred to. In this way, from the pin and star wheel referred to, the lowermost feed-roll $e^{15}$ has given to it an intermitting rotation, the roll $e^{16}$ being rotated by friction with the laps. The two laps between the lap-rolls referred to and the rolls $e^{15}$ $e^{16}$ are led side by side down through suitable guide-troughs, as $e^{23}$, one of the said troughs being broken out partially in Fig. 1, the ends of the laps being carried between the rolls $e^{15}$ $e^{16}$ and between the nippers to be described.

Figures 8, 9:
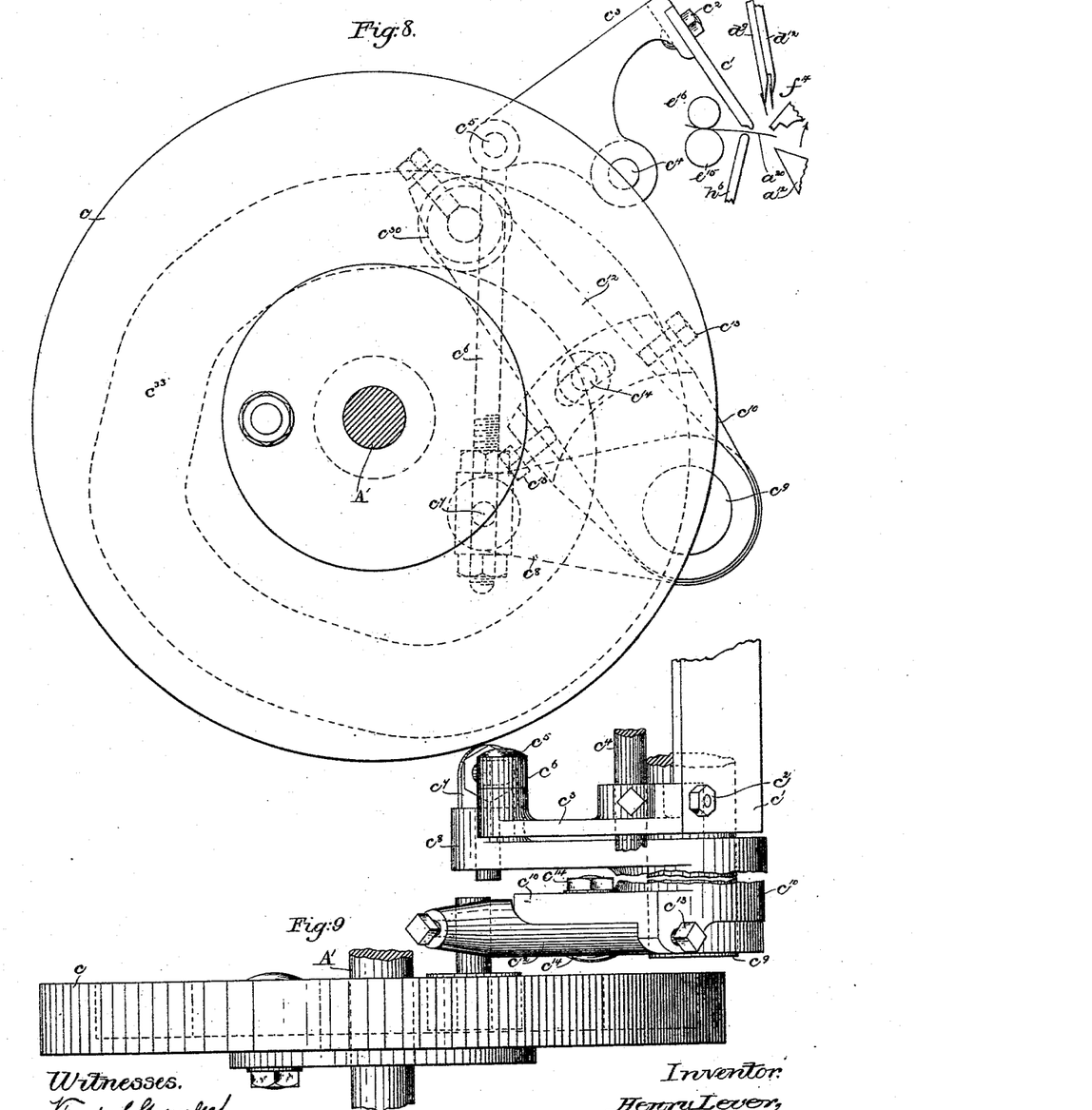
Fig. 8 is an enlarged detail, to be referred to, showing the nippers and means for working them, the view being from the left-hand side of the machine, the said figure also showing the lap-feeding rolls, part of the top comb, and parts of the jaws carried by the cylinder.
Fig. 9 is a partial plan view of the parts shown Fig. 8.

The upper member of the nipper is composed, essentially, of a plate $c'$, having a somewhat concaved acting-edge, (see Fig. 8,) the said plate being attached by suitable screws $c^2$ to the front ends of arms $c^3$, fast upon a rock-shaft $c^4$, there being one such arm near each side frame. Each of the arms $c^3$ has a stud, as $c^5$, over which is placed the upper end of a connecting-rod $c^6$, represented by dotted lines in Fig. 8 and in full lines, Figs. 4 and 9, each connecting-rod being adjustably secured by suitable nuts in the head of a rocking bolt $c^7$, the shank of which bolt is free to rock in an arm $c^8$ of a rock-shaft $c^9$, supported in suitable bearings or stands of the frame-work. The rock-shaft $c^9$ at the left-hand end of the machine has fast upon it a short arm $c^{10}$, recessed at one side to receive an arm $c^{12}$, which is mounted loosely upon the said rock-shaft. The arm $c^{10}$ has two like set-screws $c^{13}$, the adjustment of which out or in by acting upon the edges of the arm $c^{12}$ enables the said arm to be adjusted so as to control the movement of the upper member of the nippers, so that the said member may be caused to descend to any desired point, according to the length of the fiber then being combed. The arm $c^{10}$ is slotted, as represented by dotted lines in Fig. 8, and receives through it a bolt, as $c^{14}$, which is extended through the arm $c^{12}$. The bolt $c^{14}$ may have its nut turned up tight to secure the arm $c^{12}$ in the position into which it may be adjusted by the adjusting-screw $c^{13}$. The fibers at the ends of the laps are combed out by the teeth 44 of the combs as they, in the rotation of the comb-cylinder, meet the ends of the laps outside the nippers, and from which ends the jaws have just drawn tufts, the said teeth thus combing the ends of the laps to prepare them to be grasped by the next jaw in succession. The cam-plate $c$, employed to move the arm $c^3$, has at its inner side a cam-groove $c^{33}$, the outline of which is shown by dotted lines in Fig. 8, the said cam-groove receiving a roller or other stud $c^{30}$, extended therein from the arm $c^{12}$. The rock-shaft $c^4$ described has loose upon it a nipper-carrier $h$, (see Figs. 4, 10, and 11,) to arms of which above the said rock-shaft are connected two like adjusting-springs $h'$, the said springs having at their ends adjusting-screws $h^2$, which are extended loosely through rocker-blocks $h^3$, where they have applied to them nuts $h^4$, the said rocker-blocks being supported in the outer ends of brackets $h^5$, fixed with relation to the frame-work, the rotation of the nuts $h^4$ increasing or decreasing the strength of the spring $h'$, as desired.

Figure 10:
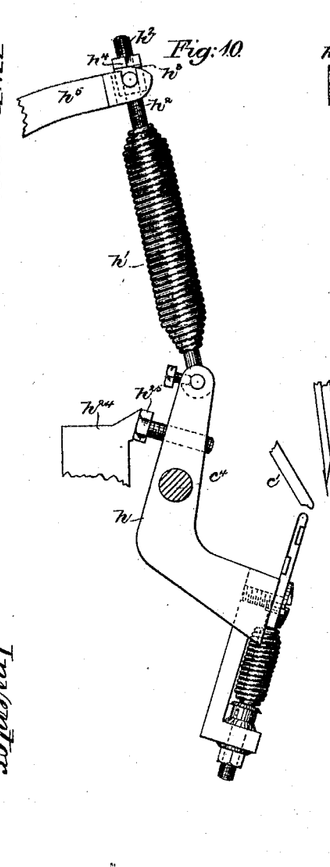
Figs. 10, 11, and 12 are details to be referred to, and illustrating the construction of the movable member of the nippers.
Figures 11, 12:
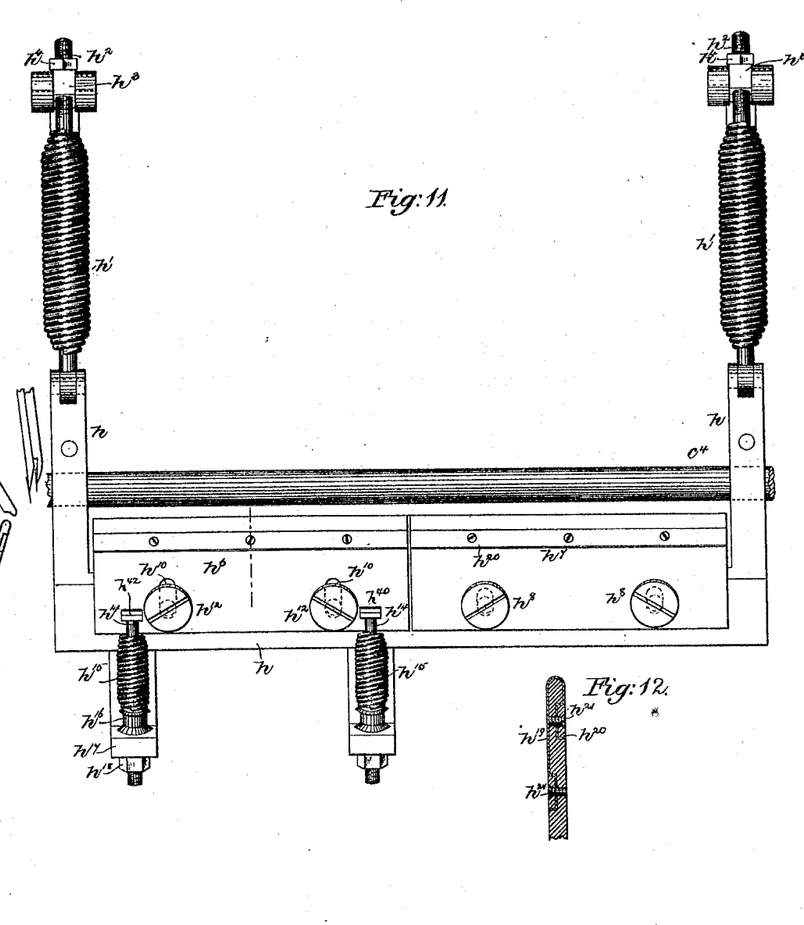

The nipper-carrier $h$, as best shown in Figs. 10 and 11, has secured at its end near the center of the machine the two plates $h^6$ $h^7$, the lower member of the nippers so constructed being divided. The plate $h^7$ is confined to the nipper-carrier by screws $h^8$, extended through slots in the said plate and into the nipper-carrier, the slots permitting the adjustment of the plate $h^7$ vertically. The plate $h^6$ is slotted, as at $h^{10}$, to receive the shanks of stud-screws $h^{12}$, the latter acting merely to prevent the plates from becoming detached from the nipper-carrier $h$, the said slots, however, permitting the plate $h^6$ to be adjusted transversely with relation to the nipper-carrier and on the said stud-screws. The plate $h^6$ is provided near its lower edge with two T-shaped slots $h^{40}$, as shown in Fig. 11, in which slots are placed the heads $h^{42}$ of the bolts $h^{14}$, the shank of each bolt being extended down through a spiral spring $h^{15}$, a nut $h^{16}$, having a loose washer above and below it, and an ear $h^{17}$, fixed with relation to the nipper-carrier, and then through a nut $h^{18}$, the lower edge of the plate $h^6$ resting on the tops of the springs $h^{15}$. The adjustment of the two nuts $h^{16}$ and $h^{18}$ enables the upper edge of the plate $h^6$ to be adjusted to occupy a position just a little above the line of the edge of the fixed plate $h^7$, yet the plate $h^6$ is spring-supported and free to yield to a limited extent, that being determined by the difference between the thickness of the heads $h^{42}$ and the area of the slots $h^{40}$, measured in the direction of the thickness of the plate $h^6$. By adjusting the said nuts the effective strength of the springs $h^{15}$ may be regulated so that the extent of movement of the plate $h^6$ upon the shanks of the stud-screws $h^{12}$, when the said plate $h^6$ meets the lap supported at its upper side by the plate $c'$, may be controlled. By mounting the plate $h^6$ loosely upon the nipper-carrier said plate, constituting one-half of the divided nipper, is enabled to adapt itself to the thickness of the lap to be engaged by it. It is impossible to make a lap of uniform thickness from edge to edge, and, as the fiber has to be held very firmly while it is being combed by the combs of the comb-cylinder, it becomes absolutely essential to divide one member of the nipper into sections, in order that the nippers may adapt themselves to any variations of the thickness of the two laps, or even of a single lap of eight or more inches in width.

In practice the plates $h^6$ $h^7$ are covered in usual manner, the covering being herein shown as marked $h^{19}$, it being supposed to be of leather, the said covering being held in place by bars $h^{20}$, laid in grooves made in the plates $h^6$ $h^7$, the said bars being attached by suitable screws $h^{21}$. The springs $h'$ act normally to keep the edges of the plates $h^6$ $h^7$ of the nippers pressed against the edge of the plate $c'$; but to enable the jaws of the comb-cylinder to draw the fiber out from between them, I have provided the frame-work near each side with lugs or stops $h^{24}$, against which, as the plate $c'$ is being lifted, comes a stop-screw $h^{25}$, the contact of the said stop-screw with the said stop arresting the upward movement of the nipper-carrier $h$; but the levers $c^3$, carrying the plate $c'$, continue to rise until the plate $c'$ is lifted sufficiently above the plates $h^6$ $h^7$ to release the laps and permit the fiber to be taken from the ends of the laps by the jaws $a^{12}$ $f^4$, to be described, the fiber being taken in the form of tufts, the fiber as it is drawn from the laps being drawn by the jaws through the top comb, to be described, such operation combing the outer ends of the tufts held by the jaws. The cam $d$, on the main shaft $A'$, (see full lines, Figs. 16 and 17, and dotted lines, Fig. 3,) acts upon a roller or other stud $d'$, carried by an arm $d^2$, fixed to a rock-shaft $d^3$, the said rock-shaft having fast on it, near each end by a suitable set-screw, as $d^5$, like arms $d^4$. The rock-shaft $d^3$, just within the frame-work near each side, has loose upon it the hubs of like arms $d^6$. The arms $d^6$ are united at their outer ends by a cross-bar $d^7$, upon which is secured by suitable bolts or screws $d^8$ a plate $d^9$, provided at its lower end with a series of fine combs, the said plate, as herein represented, having attached to it by screws $d^{10}$ a second plate $d^{12}$, provided at its lower end with a series of teeth to constitute a comb. Only a part of the teeth are shown on the plates in Figs. 16 and 17.

I shall denominate the combs just referred to, whether in one or two rows, as the "top" comb. Each lever $d^6$ has a lug $d^{13}$, in which is inserted an adjusting-screw $d^{14}$, the lower end of which normally impinges against the end of one of the arms $d^4$, rotation of the said screw adjusting the position of the arms $d^6$, carrying the top comb, with relation to the rock-shaft $d^3$, so that the teeth of the said comb may descend to the proper point in their operation. The cam $d$ is so shaped as to permit the top comb to descend and enter the tufts of fiber as the latter are being taken from the ends of the laps by the jaws to be referred to, the top comb acting to straighten the outer ends of the fibers forming the tufts. As the clamping-jaws $a^{12}$ $f^4$, carried by the comb-cylinder, draw the fiber clamped by them through the teeth of the top comb, the nippers between the rolls $e^{15}$ $e^{16}$ and the top comb are opened, and they remain open until tufts of the proper length have been drawn out and combed by the top comb, when the nippers close, leaving a quantity of the lap projecting out in front of them. The nippers then descend, placing the ends of the laps held between them at the proper level to be entered by the teeth 44 of the combs carried by the comb-cylinder $a^5$, and at the same time the top comb is elevated so as to place it out of the range of movement of the combs carried by the comb-cylinder. The feed-rolls act to feed the laps forward just before the nippers start to move downward. The eccentric-gear $a$ engages an eccentric-gear $a'$, fast on a short shaft $a^2$, the said gears being best shown in the detail, Fig. 2$^\mathrm{a}$, the said eccentrics enabling the shaft $a^2$ to be rotated at a variable speed with relation to the main shaft $A'$. The shaft $a^2$ has fast upon it a pinion $a^3$, (see Fig. 1,) which engages a large gear $a^{30}$, fast on the journals $a^4$ of the comb-cylinder $a^5$, the said cylinder being composed of metal and having several annular projections $a^{55}$, as shown in Fig. 7$^\mathrm{b}$, where the cylinder and its journals are shown on a very small scale.

Figures 6, 7:
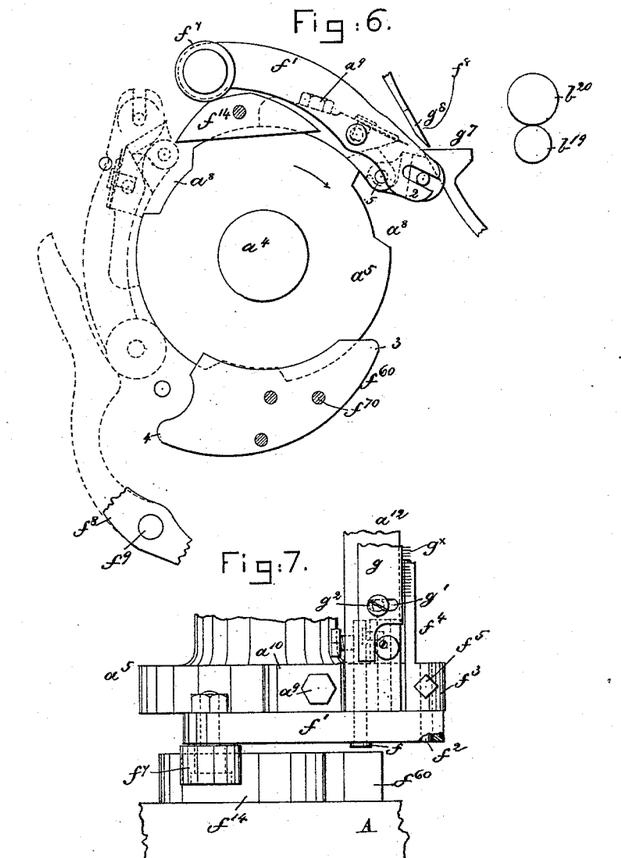
Fig. 6 is a detail on an enlarged scale looking toward the right-hand side of the machine from within the left-hand side frame of the machine, the said figure showing the body of the cylinder, but with the combs removed, the figure showing by full and dotted lines two fixed and two movable jaws, but in different positions, and means for operating the movable jaw, part of the table, part of the holder, and one pair of drawing-rolls, also stationary cams supposed to be attached to the inside of the frame of the machine, and one of the levers to keep the roller or other stud of the arm for opening the movable jaw in toward the cylinder when the jaw is to be closed upon the fiber.
Fig. 7 is a top or plan view at one end of some of the parts shown in Fig. 6, but with a part of the side frame at the left-hand side of the machine. Fig. $7^a$ is a detail simply to show one end of the comb-cylinder with one of the three like combs to be used thereon in place, the said combs being omitted from Figs. 6 and 7 to avoid confusion in the drawings. Fig. $7^b$ shows on a greatly-reduced scale the comb-cylinder without the combs or jaws, one of the journals being broken off.
Figures 7A, 7B:
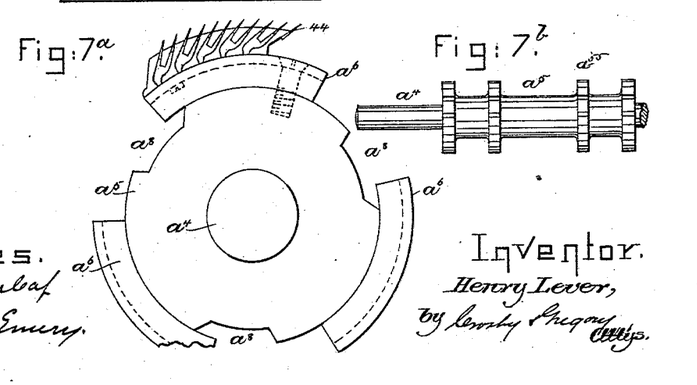
Figure 18:
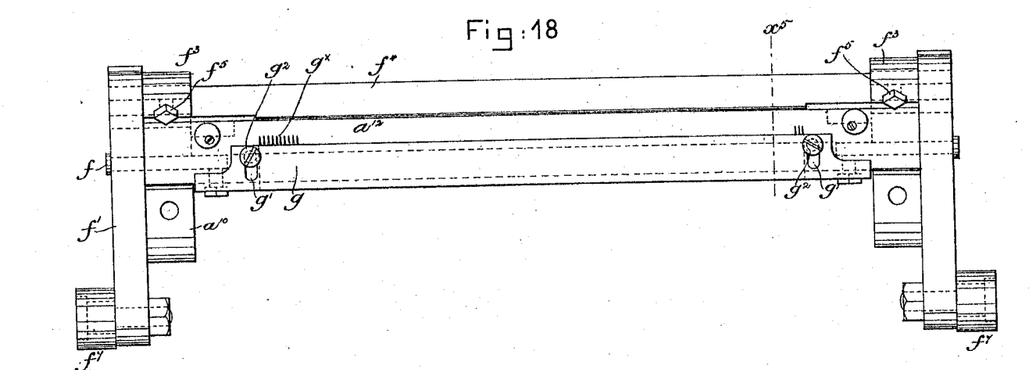
Fig. 18, a plan view of the jaws removed from the comb-cylinder, and the levers extended from the oscillating jaw.
Figures 19, 21:
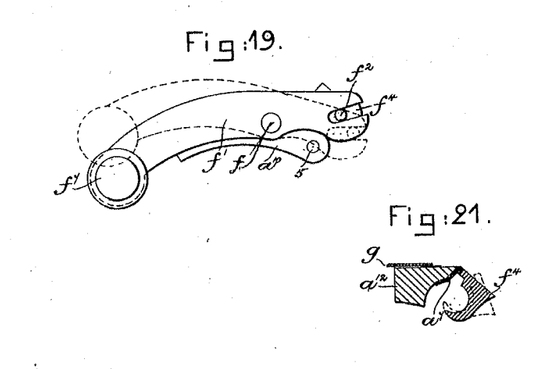
Fig. 19 is a right-hand end view of the parts shown in Fig. 18.
Fig. 21 is a section on the line $x^5$, Fig. 18, looking to the left.
Figure 20:
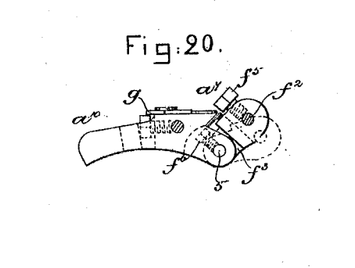
Fig. 20 is a like view with the lever $f'$ removed and the pin $f^2$ in section.

The annular projections of the comb-cylinder, shaped as best represented in Fig. 6, have secured to them, as shown in the detail, Fig. 7$^\mathrm{a}$, the segmental plates $a^6$, three such plates being employed, each plate in practice carrying like combs 44, they having fine points, all as usual. The comb-cylinder is cut away, as at $a^8$, to give space for the entrance of part of the movable jaw, to be described, when the latter is turned on its pivot 5. The annular projections or disks at the ends of the comb-cylinder have bolted upon their peripheries by bolts $a^9$ the ears $a^{10}$ of the fixed jaws $a^{12}$, the said parts being best shown in Figs. 6 and 7. The bolts $a^9$, referred to, are omitted from Fig. 1 because they come directly below the journal $g^4$. One of these jaws is partially shown in Fig. 7, and Fig. 6 shows by dotted lines one set of jaws as closed and by full lines a set of jaws as open to deliver the tuft, Figs. 18 to 21, inclusive, showing the said jaws detached from the cylinder. The acting edges of the fixed jaws $a^{12}$ will, in practice, be covered, preferably, with leather, as at $a^7$, as best shown in Figs. 20 and 21. The ends of the ears $a^{10}$ in the direction of the movement of the cylinder $a^5$ have holes to receive journals 5, (see Figs. 19 and 20,) which enter ears $f^3$ at the end of the movable jaws $f^4$, the said journals forming the pivotal points of the said jaws and being held by set-screws $f^6$. The ends of the fixed jaws receive pins $f$, which serve as the fulcra for the levers $f'$, the said levers being slotted at their forward ends to receive pins $f^2$, shown as secured by set-screws $f^5$ to each ear or hub $f^3$ of the movable or tipping jaw $f^4$, the shape of the said jaw $f^4$ in cross-section being shown in Fig. 21, which is a section of Fig. 18 in the line $x^5$.

In the machine herein to be described it is supposed that the comb-cylinder carries three fixed and three movable jaws. Preferably, the acting edge of the movable or tipping jaw $f^4$ will be fluted or toothed finely better to retain its hold upon the fiber. Each lever $f'$ has at one end a roller or other stud $f^7$, which in the rotation of the cylinder in the direction of the arrow thereon in Fig. 6 meets the end 3 of the cam-plate $f^{60}$, fixed by suitable bolts or screws $f^{70}$ to the inner side of the frame-work of the machine, there being one such cam secured to each side frame, the said frame being partially shown in Fig. 7, but entirely omitted from Fig. 6. As soon as the roller $f^7$ strikes the cam $f^{60}$ the lever $f'$ is moved in the direction to oscillate the movable jaw about the studs or journals 5, thus turning the acting face of the said movable jaw away from the acting face $a^7$ of the fixed jaw $a^{12}$; but as soon as the said roller passes the end 4 of the said cam $f^{60}$ the lever $f'$ is quickly turned by the cam-arm $f^8$, to be described, about its fulcrum $f$ in a direction to cause the said movable jaw $f^4$ to be thrown quickly toward the fixed jaw $a^{12}$ and grasp the fiber represented at $a^{20}$ (see Fig. 8) as extended from the end of the usual bats or laps. As the roller or stud $f^7$ leaves the end 4 of the cam $f^{60}$ it strikes against the cam-shaped lever $f^8$, pivoted at $f^9$, there being one such lever at each side of the machine, each lever having a stud, as $f^{10}$, (see Fig. 4,) upon which is hung a like chain $f^{12}$, to which is attached a suitable weight $f^{13}$, the weight serving to keep the end of the lever $f^8$, against which the said roller bears, pressed toward the comb-cylinder, the lever $f^8$ by its action on the roller $f^7$ serving to hold the lever $f'$ in such position as to maintain the movable jaw closed upon the tufts of fiber held between it and the fixed jaw until the said tufts are to be delivered upon the table. In the rotation of the comb-cylinder $a^5$, by the time the roller $f^7$ passes the upper end of the lever $f^8$ the lever $f'$ arrives in such position as by its own gravity to keep the jaw $f^4$ closed; but as soon as the said roller $f^7$, in the further rotation of the cylinder, meets the cam $f^{14}$, suitably fixed to the inside of the frame-work, then the lever $f'$ is so moved as again to open or turn the movable jaw $f^4$ away from the fixed jaw $a^{12}$, as shown by dotted lines at the right-hand side of Fig. 6 and in Fig. 21. Each fixed jaw $a^{12}$ has laid upon it loosely an auxiliary comb $g$, having a series of fine needle-pointed teeth $g^\times$, the said comb being slotted at each end, as at $g'$, (shown best in Fig. 18,) to receive a stud-screw, as at $g^2$, the said slot and screw permitting the auxiliary comb to be moved transversely or in the direction of the width of the fixed jaw, causing the teeth $g^\times$ to project beyond the face of the said fixed jaw from the position shown in Fig. 18 to that shown by dotted lines at the right of Fig. 6, as the jaws $a^{12}$ $f^4$ are to give up the tufts of fiber held by them. When the face of the fixed jaw in the rotation of the comb-cylinder arrives under the fibers projecting from the ends of the laps, the auxiliary comb $g$ occupies such a position by its own gravity with relation to the fixed jaw that the teeth $g^\times$ of the said comb are retracted or do not project beyond the face of the fixed jaw $a^{12}$, such position being shown by dotted lines at the left of Fig. 6, and the comb $g$ remains in such position on the jaw $a^{12}$ until the jaws in the rotation of the comb-cylinder are about to be opened, when the pusher to be described acts upon the comb $g$ and pushes it so as to cause the teeth $g^\times$ to be projected into the tufts of fiber held by the said jaws, the said teeth acting as the tufts are being detached by the holder $g^8$ and table $g^7$ to comb out the rear ends of the said tufts, such position of the teeth $g^\times$ being shown by dotted lines in Fig. 6 and by full lines, Fig. 7.

Figure 1:
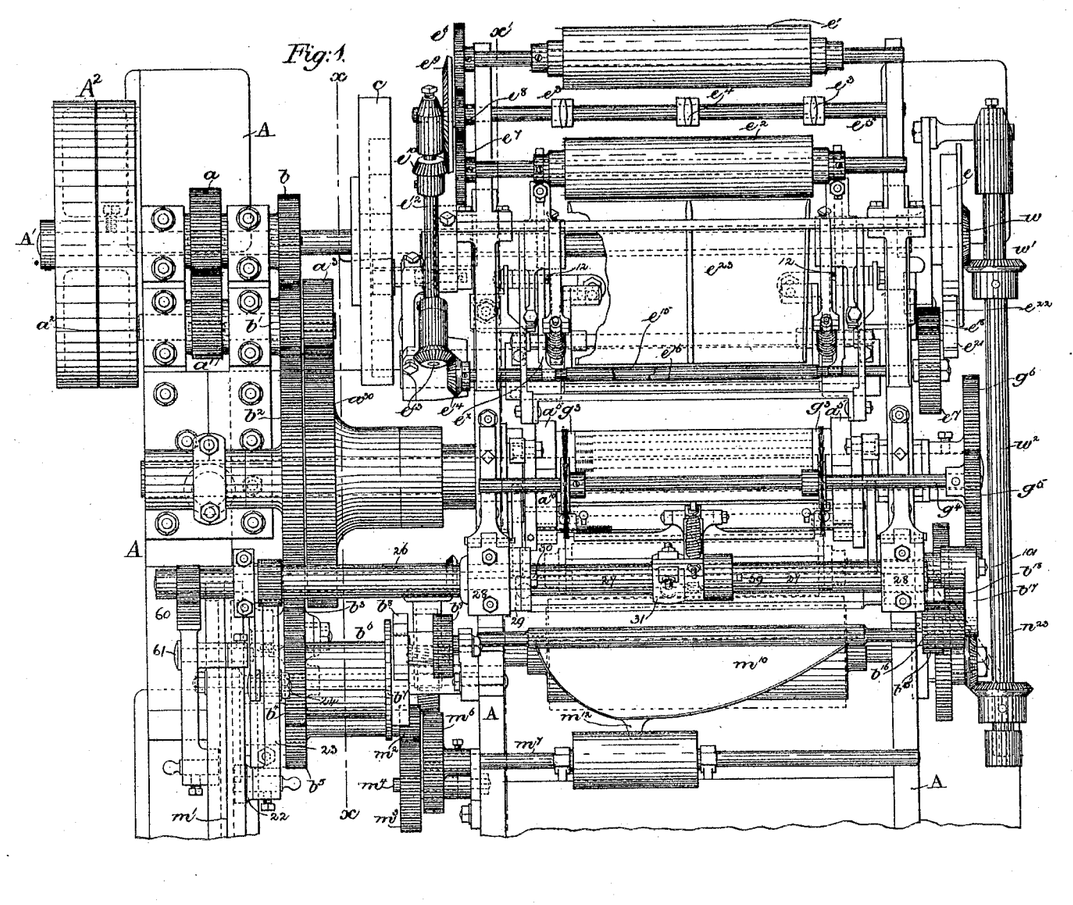
Figure 1 of the drawings is a broken top or plan view of a machine embodying my invention.
Figures 2, 2A:
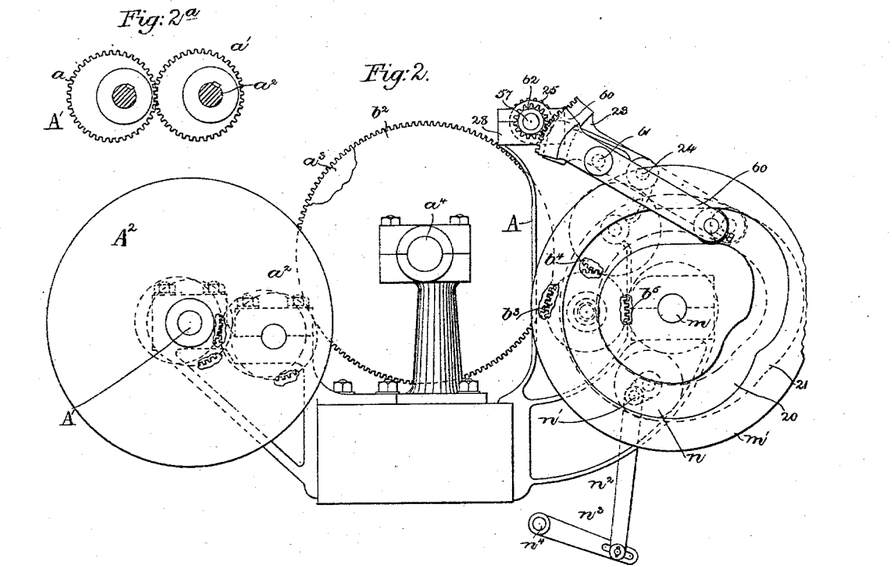
Figure 4:
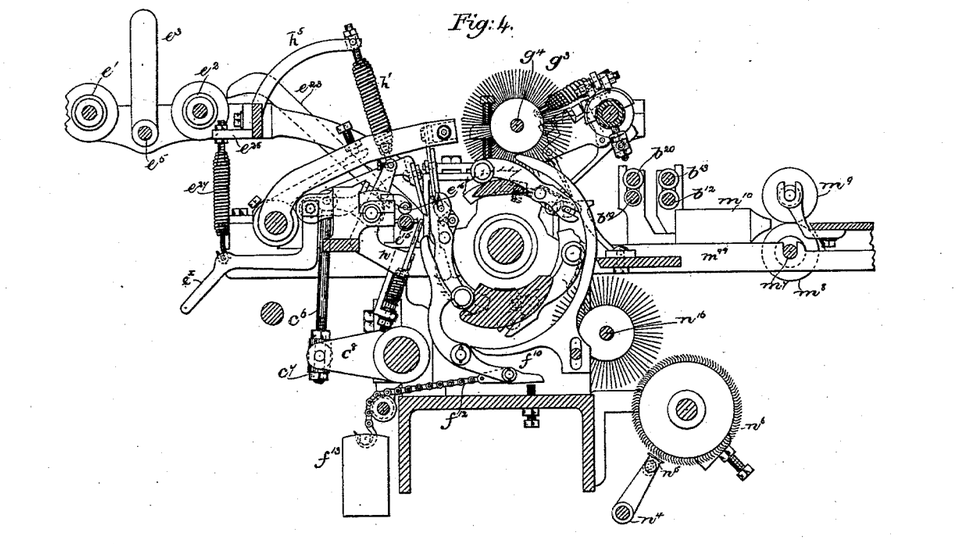
Fig. 4 is a section in the line $x'$, Fig. 1.

The pusher shown in Figs. 1 and 4 is represented as composed of two brushes $g^3$ on a shaft $g^4$, the said shaft having a pinion $g^5$ engaged by the pinion $g^6$ (see Fig. 5) at the right-hand side of the machine. The pusher in its rotation acts upon the auxiliary comb $g$ and slides the same bodily forward in the direction of rotation of the comb-cylinder just before the combed ends of the tufts of fiber held by the jaws are laid upon the table $g^7$, the rear ends of the said tufts being combed out by the said teeth, while the delivery-bar $g^8$, which is thrown down upon the end of the tufts as soon as they come upon the table $g^7$, acts upon the said tufts to hold them, the jaws being then open. The tufts taken from the jaws are laid upon and so as partially to overlap other tufts previously deposited upon the table $g^7$ by a jaw preceding the last one to open up its tufts. The toothed gear $g^6$ referred to is fast upon the right-hand journal of the comb-cylinder. The pinion $b$ on the shaft $A'$ engages an intermediate pinion $b'$ loose on the shaft $a^2$, before described, it engaging in turn a large toothed gear $b^2$, which is mounted loosely upon the end of the comb-cylinder shaft, the said gear $b^2$ engaging an intermediate pinion $b^3$, (shown in Fig. 2,) by breaking out the cam $m'$ to be described at the left-hand end of the machine. The intermediate pinion $b^3$ engages and rotates two pinions, one marked $b^4$ and the other $b^5$. The pinion $b^4$ forms part of a hub $b^6$ of a pin-wheel $b^7$, (shown separately in Fig. 3ª,) the pin 100 of the said pin-wheel engaging intermittingly a star-wheel $b^8$, having fast to it a pinion $b^9$, which engages (see Fig. 3) a pinion $b^{10}$ on the shaft of the lowermost drawing-roll $b^{12}$ of the pair of drawing-rolls $b^{12}$ $b^{13}$. (See Fig. 4.)

The lowermost drawing-roll $b^{12}$ at the right-hand end of the machine (see Fig. 5) has fast upon it a pinion $b^{15}$, which engages the teeth of an idle-wheel $b^{16}$, much wider than the gear $b^{15}$, and mounted loosely on a stand $b^{17}$, fixed to the frame-work by a bolt 101, as best shown in Fig. 1, the said idle-wheel being driven by the pinion $b^{15}$, and engaging a pinion $b^{18}$ on the journal or shaft of the lowermost roll $b^{19}$ of the pair of drawing-rolls $b^{19}$ $b^{20}$, nearest the comb-cylinder. By changing the idle-wheel $b^{16}$ for one of another size, any desired difference in speed between the two pairs of drawing-rolls may be secured, that depending upon the fiber being combed. The gear $b^5$ is fast on a short shaft $m$, having at its outer end at the left-hand side of the machine, viewing Figs. 1 and 2, a double cam $m'$, or a cam with two grooves, one at each of its sides, the cam herein shown having at its outer side a groove 20, represented by full lines in Fig. 2, while at its inner side it has a groove, as 21, of the shape shown by dotted lines in Fig. 2. The shaft $m$ has at its inner end a gear $m^2$ (shown best in Fig. 3,) which engages a toothed gear $m^3$, loose on a stud $m^4$, the said gear having connected to it at its inner side a small pinion $m^5$, shown by breaking away the gear $m^3$, the said gear $m^5$ engaging a gear $m^6$, fast on the shaft $m^7$, carrying the undermost roll $m^8$ of the pair of condensing-rolls $m^8$ $m^9$, of usual construction.

The frame-work of the machine between the condensing-rolls and the drawing-rolls referred to has a suitable plate or bed, as $m^{99}$, upon which rests a conductor, as $m^{10}$, usually made of tin, the said conductor having a trumpet $m^{12}$, to collect into the form of a sliver the thin combed web delivered from the drawing-rolls and formed from the successive rows of tufts laid upon the table $g^7$. The cam-groove 21, at the inner side of the cam $m'$, receives in it a roller or other stud, as 22, (see Fig. 1,) carried by a sector-lever 23, having its fulcrum upon a stud 24, extended from the frame-work. The teeth of the sector-lever 23 engage the teeth of a pinion 25 on a compound tubular shaft 26 27, having bearings at 28. The adjacent ends of the portions 26 27 of the said tubular shaft have like annular flanges 29 connected by a set-screw 30, the said set-screw being extended through a slot in one of the said flanges, preferably the flange at one end of the portion 27 of the said shaft. Connecting the two parts of the tubular shaft together in this manner enables the part 27 to be adjusted, as may be desired, correctly to time the movements of the holder $f^8$.

Figures 13, 14:
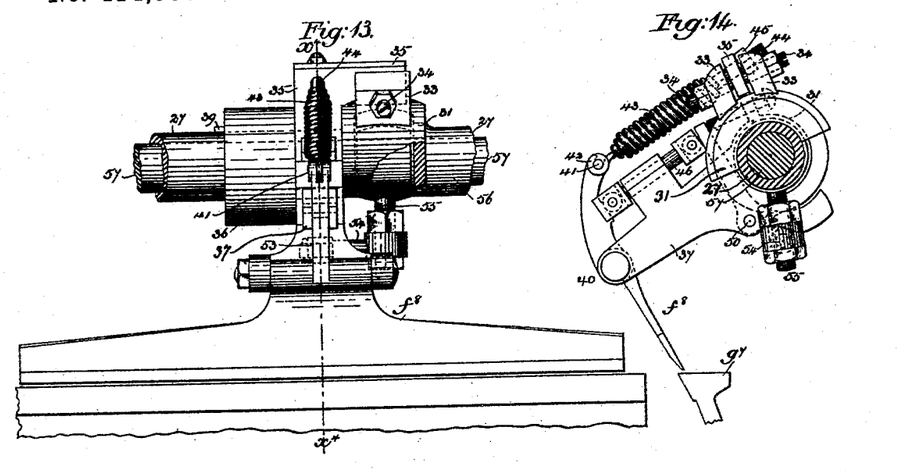
Fig. 13 is a detail showing the table, the tuft-holder, and part of its actuating mechanism.
Fig. 14 is a right-hand end view of the parts shown in Fig. 13.
Figures 15, 15A:
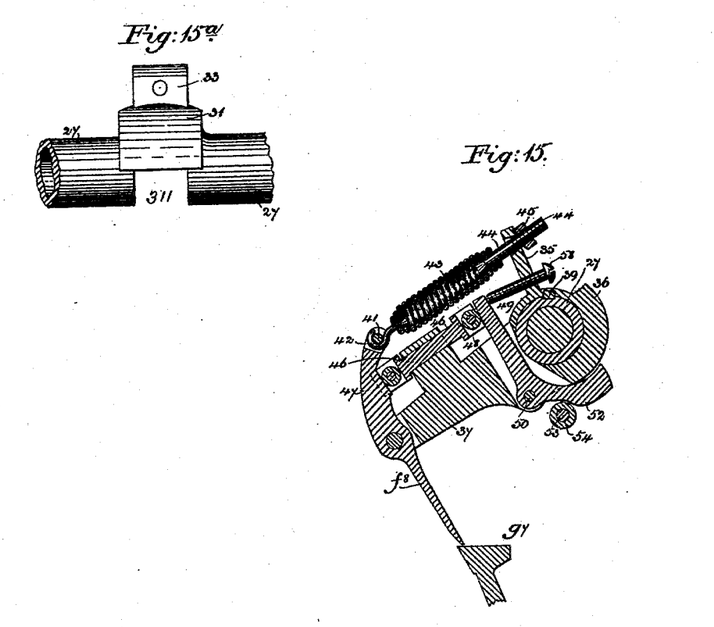

The shaft 27 (shown separately in Fig. 15$^a$) has an enlargement 31, which is cut away at its under side for part of its circumference to leave an open space or slot 311, as in Figs. 14 and 15$^a$, another part of the said enlargement having two like ears, as 33, in each of which is placed a like adjusting-screw 34, and between them is placed an ear or finger 35, extended laterally from a hub 36 of a holder-carrier 37, the hub of the said carrier being grooved at its interior to receive a key, as 39, which, when driven into the said groove and in contact with the smooth periphery of the tubular shaft 27, acts to hold the said hub on the said shaft. The carrier 37 has pivoted upon it at its outer end, as at 40, the holder $f^8$, the upper end of which has a stud, as 41, which is engaged by an eye 42 at the end of a spring 43, connected to a bolt 44, extended loosely through the finger 35, the said bolt having applied to it a nut, as 45, adjustment of the spring 43 enabling the holder $f^8$ to bear with more or less force upon the combed tufts as they are being taken from the jaws $a^{12}$ $f^4$ of the combing-cylinder. The carrier 37 has mounted in it a slide-rod 46, having at each end a suitable roller or stud, as 47 48. One arm of the holder $f^8$ is kept normally pressed against the roll 47 by the spring 43, and thereby the roll 48 is kept pressed normally against one end of a lever 49, having its pivot at 50 on the carrier 37 and extended upwardly in a slot in the said carrier. The lever 49 is herein shown as of elbow shape, and at its lower end it has a cam-surface, as 52, to be acted upon by a roll 53 on a stud 54, clamped to a threaded stud, as 55, extended from a collar 56, secured to the shaft 57, about which the tubular shaft 27 turns, as will be described. The finger 35 receives in it an adjusting-screw 58, the adjustment of which controls the extent of backward movement of the lever 49 through the spring 43, referred to. The cam-groove 20 at the outer side of the cam $m'$ receives in it the roller or other stud at the end of a toothed sector 60, having its fulcrum at 61 on a stud carried by the frame-work, the tooth of the said sector engaging a pinion 62, fast on the shaft 57, referred to, it having its bearings within the tubular shaft 26 27. The sector 60 in its movements rocks the shaft 57 and causes the roll 53 to act upon the lever 49, and through it and the slide-rod 46 to turn the holder $f^8$ on its fulcrum 40, and thus lift the lower end of the holder above the table $g^7$ and the tufts laid thereon prior to the movement of the holder back toward the comb-cylinder. The downward motion of the holder $f^8$ upon the tuft is effected by the sector 23 just after the tuft has been laid upon the table $g^7$. As soon as the holder descends upon the tuft the jaws $a^{12} f^7$ are opened by the cam $f^{14}$, and then during a farther downward movement of the carrier 37 the lower end of the holder $f^8$, resting upon the tuft and arrested by the table, is made to travel horizontally along over the surface of the said table, taking with it the tuft and at the same time drawing the rear ends of the tuft through the auxiliary comb $g^x$ described. One tuft after another, taken from the jaws of the comb-cylinder, is laid upon the table $g^7$, each row of tufts partially overlapping the preceding row. By the employment of the eccentric-gears $a$ $a'$, referred to, it is possible to give to the comb-cylinder a variable speed with relation to the main shaft $A'$, the variation in speed being such as to enable the comb-cylinder to be rotated at its slowest speed just about as the movable jaw of the clamp carried by the comb-cylinder is engaging the combed end of the lap. The holder $f^8$ also operates while the comb-cylinder is moving at its slowest speed. The shaft of the comb-cylinder has one rotation to three of the main shaft. The gear $b^5$ engages and rotates a toothed pinion $n$, (shown only by dotted lines in Fig. 2,) it having a crank-pin $n'$, upon which is placed a connecting-rod $n^2$, which engages an arm $n^3$ on a shaft $n^4$, to which is secured any usual doffer $n^5$ to clean the card-clothed cylinder $n^6$, mounted in bearings in the frame-work and having upon its shaft a toothed gear $n^7$. The doffer-shaft has its bearings in hangers $n^8$. The gear $n^7$ on the doffer-shaft is a worm-toothed gear, which is engaged by a worm $n^9$ on a short shaft $n^{10}$, held in a bearing $n^{12}$, the said short shaft having at its inner end a beveled gear $n^{13}$, which is engaged by a beveled gear $n^{14}$ on a brush-shaft $n^{16}$, it having at the right-hand end of the machine a pinion $n^{17}$, which is engaged and rotated by the gear $n^{18}$ on a stud extended from a stand $n^{20}$, the said gear having attached to it a bevel-gear $n^{21}$, engaged by a bevel-gear $n^{22}$ on a shaft $w^2$, having a bevel-gear $w'$, which is engaged by a bevel-gear $w$ on the end of the shaft $A'$. The brush-cylinder in its rotation acts upon the comb-teeth of the comb-cylinder, clearing them from any fibers which may be held by them, the doffer cleaning the brush. The pins or projections $f^2$ at the ends of the rocking jaw-member $f^4$ at a short distance from the pivot 5 of the said jaw-member enter slots in the outer ends of the levers $f'$, and it will be seen that such method of connecting the movable jaw-member and the said lever constitutes a pin-and-slot connection, whereby the end of the longer lever, having a movement in the arc of one circle, is enabled to actuate the movable jaw-member in the arc of a smaller circle.

I claim—

1. The nippers to engage, hold, and deliver at the proper times the material to be combed, and a table on which the tufts taken from the said nippers are laid, and a rotating cylinder having jaws composed each of a fixed member and a rocking member, as $f^4$, pivoted at 5 and moving with the said cylinder, combined with independent pivoted levers, as $f'$, one for each movable jaw member, a pin-and-slot connection between the said levers and movable jaw members, and cams to actuate the said levers to effect the opening of the said jaws, substantially as described.

2. The rotating cylinder, its attached jaws, means to actuate one of the said jaws, the table, a holder-bar, a rocking arm on which it is pivoted, and a spring to keep the holder-bar pressed normally toward the table, combined with means to rock the said rocking arm, to operate substantially as described.

3. The rotating cylinder, its attached jaws, means to actuate one of the said jaws, the table, a holder-bar, a rocking arm on which it is pivoted, and a spring to keep the holder-bar pressed normally toward the table, combined with means to rock the said rocking arm, and with means to turn the said holder-bar on its pivot on the said arm and lift the holder-bar from the tufts as the holder-bar is to be moved back toward the jaws of the comb-cylinder, substantially as described.

4. The cylinder, the jaw member $a^{12}$, fixed thereto, the auxiliary comb mounted loosely on the said jaw member, means to actuate the said auxiliary comb, the pivoted jaw member $f^4$, and the lever $f'$, pivoted with relation to and traveling with the said cylinder and connected to the movable jaw member, combined with means to move the said levers to open and close the said jaws, and with the table and means to engage the tufts laid thereon by the jaws, substantially as described.

5. The table $g^7$, the rock-shaft 27, its arm 37, the holder-bar pivoted thereon, and the ear 35, combined with the adjustable spring 43, and means to connect it to the said bar and ear, substantially as described.

6. The table $g^7$, the rock-shaft 27, its arm 37, the holder-bar pivoted thereon, and the ear 35, combined with the adjustable spring 43, and means to connect it to the said bar and ear, and with a rod 46, lever 49, and means to actuate the said lever, substantially as described.

7. The combination, with means to support the laps, a comb-cylinder, jaws thereon, and means to actuate one of the said jaws, of nippers having one of its jaws divided or made sectional, means to actuate the said nippers, and springs co-operating therewith, whereby a part of the said nipper is enabled to yield to variations in the thickness of the material to be combed, substantially as described.

8. The arms $c^3$, the attached plate $c'$, forming part of the nippers, the nipper-carrier, the plates $h^6$ and $h^7$, and means to connect one of the said plates in a yielding manner to the said carrier, combined with means to move the said arms and carrier, substantially as described.

9. The nippers having one of their jaws divided or made sectional, and co-operating springs, as described, to enable one part of the divided jaw of the nipper to yield to variations in thickness of the laps and the rotating comb-cylinder, and its fixed and movable jaws and means to actuate the said movable jaws, combined with the top comb and with means to operate it, substantially as described.

10. The comb-cylinder, the fixed and movable jaws carried thereby, means to actuate the said movable jaws, and the loosely-mounted auxiliary comb $g$, combined with a pusher to move the said auxiliary comb on the fixed jaw of the cylinder, to operate substantially as described.

11. The supporting-rolls for the two laps placed side by side, a guide between the contiguous edges of the said two laps, and feeding-rolls to feed the two laps, combined with the nippers, one jaw of which is divided or made sectional, means to actuate the said nippers, and springs to support one part of the divided or sectional jaw in a yielding manner, substantially as described.

12. The following instrumentalities comprising a combing-machine, viz: rolls to support two laps side by side, lap-feeding mechanism, a pair of nippers, one member of which is divided or made sectional, and co-operating springs to enable a part of one of the said nippers to yield to any variations in the thickness of the said lap from edge to edge, a top comb, a rotating comb-cylinder having fixed and rocking jaws, means to operate the rocking jaw to grasp between it and the fixed jaw the material extended from the nippers, a table to receive the tufts of fiber from the jaws, a pivoted spring-actuated holder-bar to descend upon the tufts and hold and move the same longitudinally on the said table, and means to actuate the said parts, to operate substantially as described.

13. The main shaft, the lap feeding rolls, means between the said shaft and rolls to actuate the latter intermittingly, and the eccentric pinions $a$ $a'$, shaft $a^2$, pinion $a^3$, combined with the comb-cylinder and its attached toothed gear $a^{30}$, whereby the said comb-cylinder is rotated at a speed varying from that of the main shaft during each rotation thereof, for the purposes set forth.

14. The combination, with the rotating cylinder having fixed and pivoted jaws, as described, and levers $f'$, to actuate the said pivoted jaws, of the cam-lever to keep the said jaws closed in succession during a portion of each rotation of the cylinder, substantially as described.

In testimony whereof I have signed my name to this specification in the presence of two subscribing witnesses.

HENRY LEVER.

Witnesses:
G. W. GREGORY,
B. DEWAR.